US009246678B2

(12) United States Patent
Nayshtut et al.

(10) Patent No.: US 9,246,678 B2
(45) Date of Patent: Jan. 26, 2016

(54) SECURE CLOUD STORAGE AND ENCRYPTION MANAGEMENT SYSTEM (71) Applicant: Intel Corporation, Santa Clara, CA (US)

(72) Inventors: Alex Nayshtut, Gan Yavne (IL); Edward V. Jimison, Folsom, CA (US); Omer Ben-Shalom, Rishon Le-Tzion (IL); Michael Raziel, Jeruslaem (IL)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 13/803,633

(22) Filed: Mar. 14, 2013

(65) Prior Publication Data
US 2014/0281477 A1  Sep. 18, 2014

(51) Int. Cl.
*H04L 29/06* (2006.01)
*H04L 9/08* (2006.01)
*G06F 21/62* (2013.01)
*H04L 29/08* (2006.01)

(52) U.S. Cl.
CPC ............ *H04L 9/0825* (2013.01); *H04L 63/045* (2013.01); *H04L 63/0823* (2013.01); *G06F 21/6209* (2013.01); *H04L 67/02* (2013.01)

(58) Field of Classification Search
CPC .......... G06F 17/30575; G06F 21/6209; H04L 9/0825; H04L 63/045; H04L 9/0822; H04L 9/14
USPC ......................................................... 713/150
See application file for complete search history.

(56) References Cited

U.S. PATENT DOCUMENTS

| 7,178,021 | B1* | 2/2007 | Hanna ................. G06F 21/6209 713/150 |
| 7,424,615 | B1 | 9/2008 | Jalbert |
| 8,281,126 | B2* | 10/2012 | Noble et al. .................. 713/153 |
| 8,321,671 | B2 | 11/2012 | Yao |
| 8,364,975 | B2 | 1/2013 | Kumar |
| 2002/0021804 | A1* | 2/2002 | Ledzius et al. ................. 380/44 |
| 2006/0117181 | A1* | 6/2006 | Brickell ....................... 713/176 |

(Continued)

OTHER PUBLICATIONS

Intel Corporation, "3rd Generation Intel® Core™ vPro™ Processor Family Overview", 2012, 8 pages, United States.
Dropbox, Inc., "Dropbox for Teams: Administrative Controls Overview", 1 page, San Francisco, CA.

(Continued)

*Primary Examiner* — Izunna Okeke
*Assistant Examiner* — Bryan Wright
(74) *Attorney, Agent, or Firm* — Trop, Pruner & Hu, P.C.

(57) ABSTRACT

An embodiment of the invention allows a user to back-up/store data to a cloud-based storage system and synchronize that data on the user's devices coupled to the storage system. The devices have secure out-of-band cryptoprocessors that conceal a private key. The private key corresponds to a public key that is used to encrypt a session key and information, both of which are passed to and through cloud based storage, all while remaining encrypted. The encrypted material is communicated from the cloud to another of the user's devices where the encrypted material is decrypted within a secure out-of-band cryptoprocessor (using the private key that corresponds to the aforementioned public key) located within the device. The embodiment allows for secure provisioning of the private key to the devices. The private key is only decrypted within the cryptoprocessor so the private key is not "in the open". Other embodiments are described herein.

20 Claims, 6 Drawing Sheets

(56) References Cited

U.S. PATENT DOCUMENTS

| | | | |
|---|---|---|---|
| 2006/0182282 A1 | 8/2006 | Negahdar | |
| 2006/0291664 A1* | 12/2006 | Suarez | G06F 21/33 380/286 |
| 2007/0280483 A1* | 12/2007 | Fu et al. | 380/286 |
| 2008/0028206 A1 | 1/2008 | Sicard | |
| 2010/0095118 A1* | 4/2010 | Meka | G06F 21/6227 713/168 |
| 2012/0084847 A1 | 4/2012 | Balasubramanian | |
| 2013/0031356 A1 | 1/2013 | Prince | |
| 2013/0191629 A1* | 7/2013 | Treinen et al. | 713/153 |
| 2014/0019753 A1* | 1/2014 | Lowry et al. | 713/155 |
| 2014/0096182 A1* | 4/2014 | Smith | 726/1 |

OTHER PUBLICATIONS

Intel Corporation, "Enhance Security with Simple Two-Factor Authentication", 2012, 4 pages, United States.

Box, Inc., "Box Security Overview: Information That Should Help You Sleep at Night", 8 pages, Palo Alto, CA.

Google, "Overview of Google Drive", 1 page, Feb. 11, 2013.

Dropbox, Inc., "Dropbox for Teams Overview", 1 page, San Francisco, CA.

International Searching Authority, "Notification of Transmittal of the International Search Report and the Written Opinion of the International Searching Authority," mailed Jul. 22, 2014, in International application No. PCT/US2014/022402.

\* cited by examiner

SECURE CLOUD STORAGE AND ENCRYPTION MANAGEMENT SYSTEM

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Various embodiments described herein generally relate to secure communication of information between computing nodes and across cloud based storage systems.

BACKGROUND

Cloud storage services allow a user to store information, such as computer files, in a remote storage destination located "on line" or "in the cloud". The remote storage destination may be located geographically far away from whatever computing node the user works with. The remote storage may communicate with the user's computing node over a local area network (LAN), a wide area network (WAN), and/or the Internet. The remote storage destination device may include a cloud storage service, a remote IP addressable hard drive, a laptop computer, and the like. The cloud storage network may be owned and/or operated by the user, the user's organization (e.g., a corporations information technology (IT) group), or a third party. Cloud based storage provides a convenience for the user in that he or she does not need to maintain the hardware associated with such storage. Further, the user may access his or her information stored in the cloud via various computing nodes located in dispersed geographic locations.

A system of computing nodes comprising: a first computing node comprising a first secure cryptoprocessor having out-of-band non-volatile first memory that stores a hardware-based first private key that is non-visible to a first operating system (OS) for the first computing node; a second computing node comprising a second secure cryptoprocessor having out-of-band non-volatile second memory that stores a hardware-based second private key that is non-visible to a second OS for the second computing node and that corresponds to a second public key; and at least one non-transitory storage medium having instructions stored thereon to cause: the first computing node to: receive the second public key; determine a first session key and encrypt first information with the first session key; encrypt the first session key with the second public key; bind the encrypted first session key to the encrypted first information; and communicate the bound encrypted first session key and encrypted first information to cloud based storage; and the second computing node to receive and decrypt the bound encrypted first session key with the second private key, while the second private key is still located within the second cryptoprocessor, and the encrypted first information with the decrypted first session key wherein the at least one medium further comprises instructions to cause: the first secure cryptoprocessor to encrypt the first private key and communicate the encrypted first private key to the first computing node; the first computing node to communicate the encrypted first private key to the third computing node; and the second computing node to receive the encrypted first private key from the third computing node.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner An embodiment of the invention allows a user to back-up/store data to a cloud-based storage system and synchronize that data on the user's various devices that couple to the storage system. One or more of the devices have secure out-of-band cryptoprocessors that conceal a private key. The private key corresponds to a public key that is used to encrypt a session key and information, both of which are passed to and through cloud based storage, all while remaining encrypted. The encrypted material is communicated from the cloud to another of the user's devices where the encrypted material is decrypted within a secure out-of-band cryptoprocessor (using the private key that corresponds to the aforementioned public key) located within the device. The embodiment allows for secure provisioning of the private key to the devices. The private key is only decrypted within the cryptoprocessor so the private key is not "in the open". A user may securely utilize cloud based storage without reliance upon the cloud storage operator to maintain the security of keys or documents. Further, a user may securely utilize cloud based storage without reliance upon in-band based encryption techniques. Such techniques may entail reliance upon a software based encryption engine resident on one of the user's devices and accessible to an operating system (OS) of such a device.

An embodiment allows a user to back-up data to a cloud-based storage system and synchronize that data on the users' various devices that couple to the storage system. The users may be individual users or large enterprise level organizations consisting of thousands of users whose communications needs are managed by large information technology groups. Users may enlist internal cloud-based solutions or external cloud based solutions depending on the user's business and technology plans.

Users must navigate complicated security issues with cloud-based storage systems. For example, medical, legal, and many other sectors hesitate to trust cloud based storage providers with their data. However, an embodiment provides security for data stored in cloud based storage systems based on a public key infrastructure (PKI) service that issues encryption certificates and hardware-based encryption key storage and management technology to provide robust key management capability for the PKI infrastructure. The embodiment leverages the PKI and hardware based security features to encrypt/decrypt user files as they are copied to/from a cloud storage service. Further, the cloud storage system may synchronize the user's data across widely distributed computing nodes without breaching security of the data.

Figure 1:
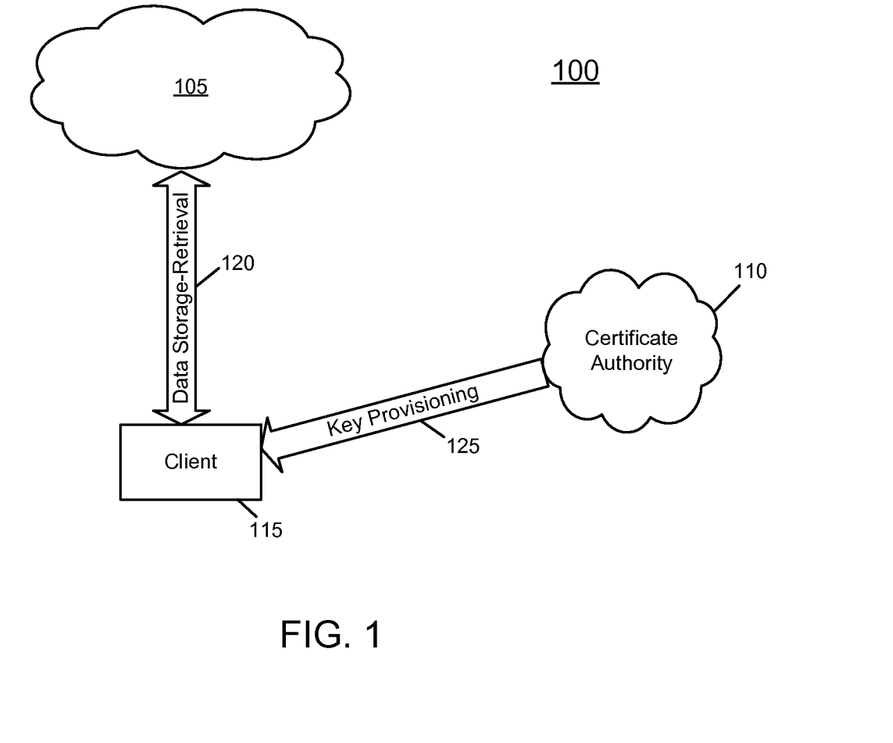
FIG. 1 includes a key provisioning system in an embodiment of the invention.

FIG. 1 includes a key provisioning system in an embodiment of the invention. A user installs an encryption certificate from certificate authority (CA) 110 to client 115. For example, client 115 receives the user's public key signed by the CA via arrow 125. The public key corresponds to a private key within or coupled to Client 115. Client 115 may store information within cloud based storage system 105 via arrow 120.

Client 115 may be a computing node such as a Smartphone, Ultrabook™ notebook, tablet, laptop, personal computer, server, personal digital assistant, cluster node, mobile computing node, and the like. FIG. 6, discussed below, provides an example of such a node like that of client 115 or any of the nodes of FIG. 5.

Client 115 may include a security coprocessor capable of providing secure key export. Such a coprocessor resides within a processing system and provides various facilities and services for enhancing the security of the processing system. For example, the security coprocessor may be implemented as an integrated circuit (IC), semiconductor chip, discreet hardware component, and/or integrated in firmware and it may be used to protect data, to attest to the configuration of a platform, and/or other actions.

One such security coprocessor includes the Intel® identity protection technology (IPT), which includes an embedded processor that is tamper-proof and operates in isolation from the OS (i.e., out-of-band). Moreover, because the credential is protected inside the chipset (i.e., security coprocessor), it cannot be compromised by malware or removed from the chipset. Such a cryptoprocessor protects, for example, keys and PKI certificates using hardware assistance, non-visible to the OS. This provides the security of hardware with the convenience and response of software. ©Intel Corp., Santa Clara, Calif. Other embodiments are not limited to use of this technology.

The sub-components of the security coprocessor may include an execution engine and secure nonvolatile (NV) memory or storage. The secure NV memory is used to store sensitive information, such as encryption keys, and the execution engine protects the sensitive information according to the security policies dictated by the security processor's control logic. Thus, the security coprocessor provides a secure cryptoprocessor having out-of-band non-volatile memory that stores a hardware-based private key that is non-visible to an OS.

In an embodiment client 115 includes a private key stored in the security coprocessor's hardware protected storage. As a result the key is not exposed in an unencrypted way (i.e., left "in the open"), even to the client's operating system (OS). The private key may correspond to the public key provisioned from CA 110. The certificate from CA 110 may be re-issued or distributed to the user's other machines that have similar hardware protected storage.

Figure 2:
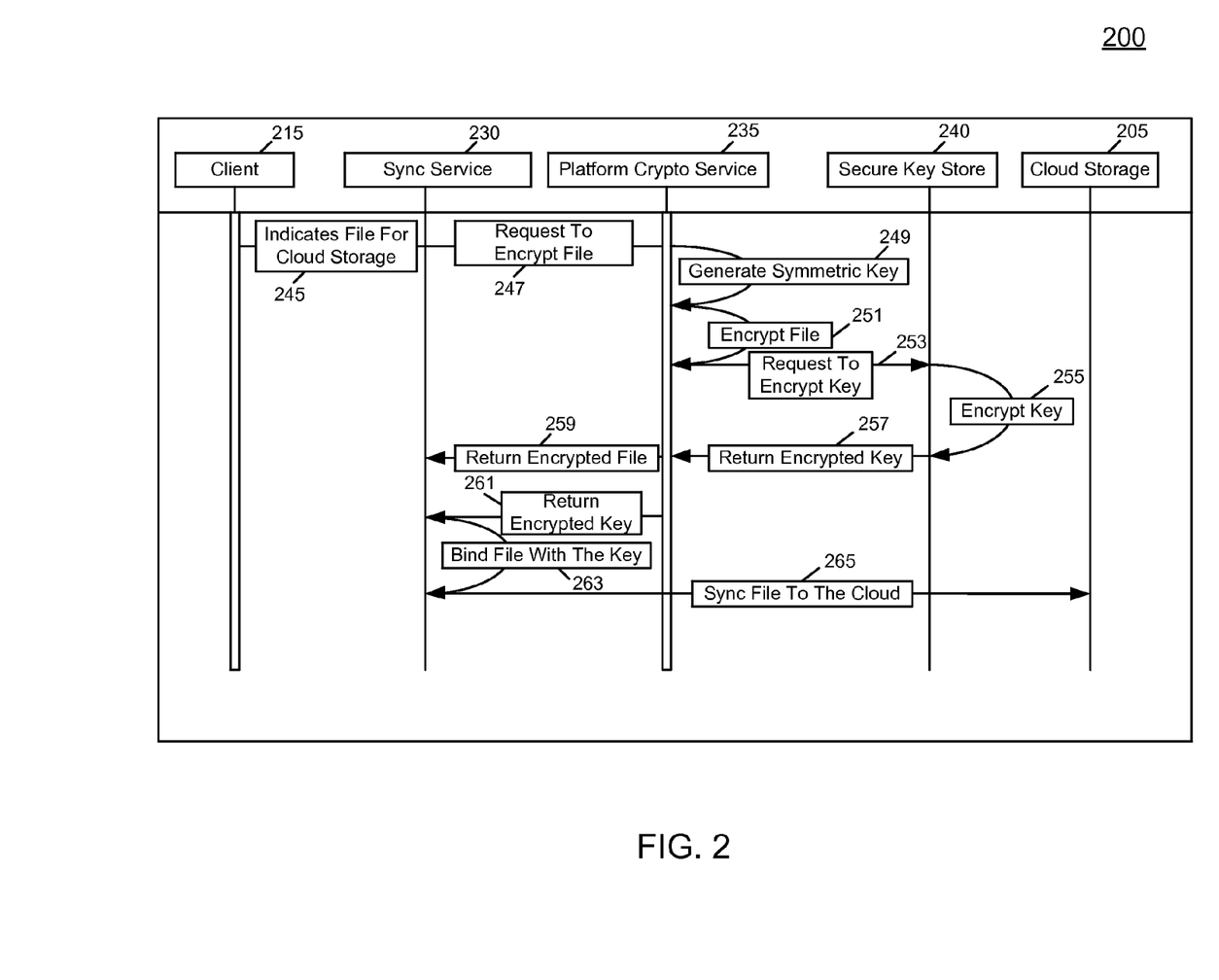
FIG. 2 includes an encryption process in an embodiment of the invention.

FIG. 2 includes an encryption process in an embodiment of the invention. Client 215 corresponds to client 115 of FIG. 1. In block 245 client 215 indicates it has a file for cloud storage. To do so, a user may mark a file for cloud back-up, which can be done by simply copying a file to a "Cloud" folder or adding content metadata so the file can be identified by appropriate filters. This desire for cloud storage may be presented to a cloud storage module 230, which may be located within or coupled to client 215, responsible for synchronizing the file across the user's various devices coupled to the cloud based storage. Module 230 may generate a call requesting encryption of the file (block 247) to a platform cryptographic service 235, such as the security coprocessor. Service 235 may include a secure key store or vault 240, which comprises non-volatile and secure storage for keys. Service 235 may generate a random symmetric key (block 249) with which to encrypt the file (block 251). Further, the symmetric key may be encrypted via a call requesting encryption (block 253) to secure key store 240 to encrypt the symmetric key with public key (block 255) received from a CA (see FIG. 1). The encrypted symmetric key may be returned to cloud service 230 and/or client 215 (blocks 257, 261). In addition, in some embodiments the session key encrypted file may be returned to cloud service 230 (block 259) and/or client 215 and may be bound to the encrypted file (block 263) via digital signature and the like. Afterwards, the bound key/file may be distributed to cloud storage 205, where it may stay and/or be distributed to the user's devices coupled to the storage 205. When the user wants to access the encrypted file on one of the user's devices the user may unwrap the session key using the private key that corresponds to the public key used in blocks 251, 255.

The embodiment of FIG. 2 illustrates how documents may be shared across a cloud based storage unit without disclosing encryption in the open. This is in contrast to cloud storage systems that provide encryption of documents but where the cloud storage provider retains ownership of the encryption keys. Despite the cloud storage provider's assurances of trust, a user may not trust that their content is fully protected and secured. One reason for concern may be the cloud storage provider's and/or the client's reliance upon software-based encryption tools to encrypt the data before storing it in the cloud. However, such software based tools are only as secure as the OS running them. If the OS is compromised on one device the master encryption keys can be exported to various locations and an attacker can view files from another location.

An embodiment addresses this shortcoming by keeping at least one master key "under cover" within the out-of-band security processor or utility. Thus, encryption keys are exported but are not exported in the open. Consequently public cloud storage services back-up documents and transfer them from device to device without having visibility into the content. This keeps the governance of the encryption key lifecycle in the hands of the user (e.g., a corporation's IT department).

Figure 3:
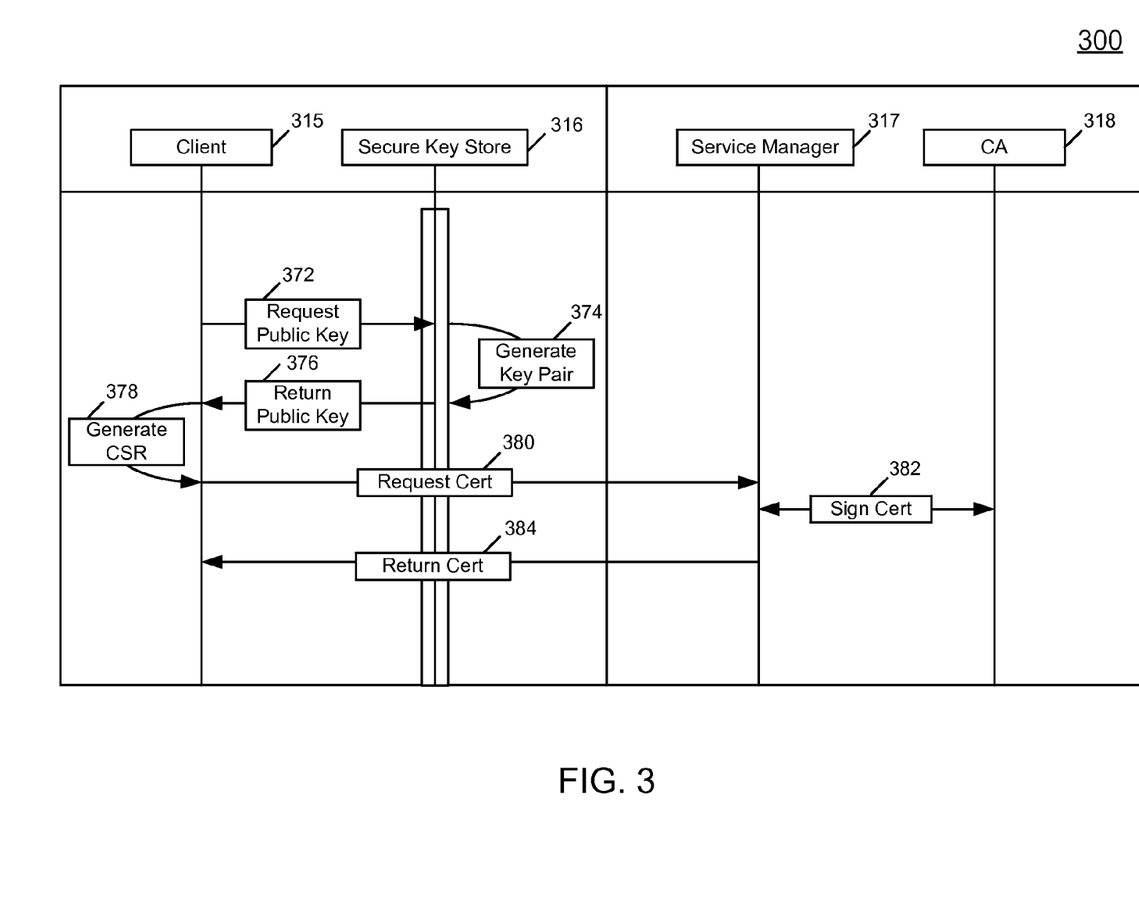
FIG. 3 includes a certificate provisioning process in an embodiment of the invention.

In FIG. 1 certificate provisioning was briefly addressed. FIG. 3 includes a certificate provisioning process in an embodiment of the invention. Client 315 requests a public key (block 372). Secure key store 316 generates a public/private key pair (block 374) and returns the public key to client 315 (block 376). Client 315 then generates a certificate signing request (CSR) in block 378 and requests a certificate from service manager 317 via block 380. CA 318 generates a signed certificate (block 382) which is returned to client 315 via block 384. The certificate may be used for authentication purposes when distributing encrypted information and public keys (as discussed further regarding FIG. 5 below).

Figure 4:
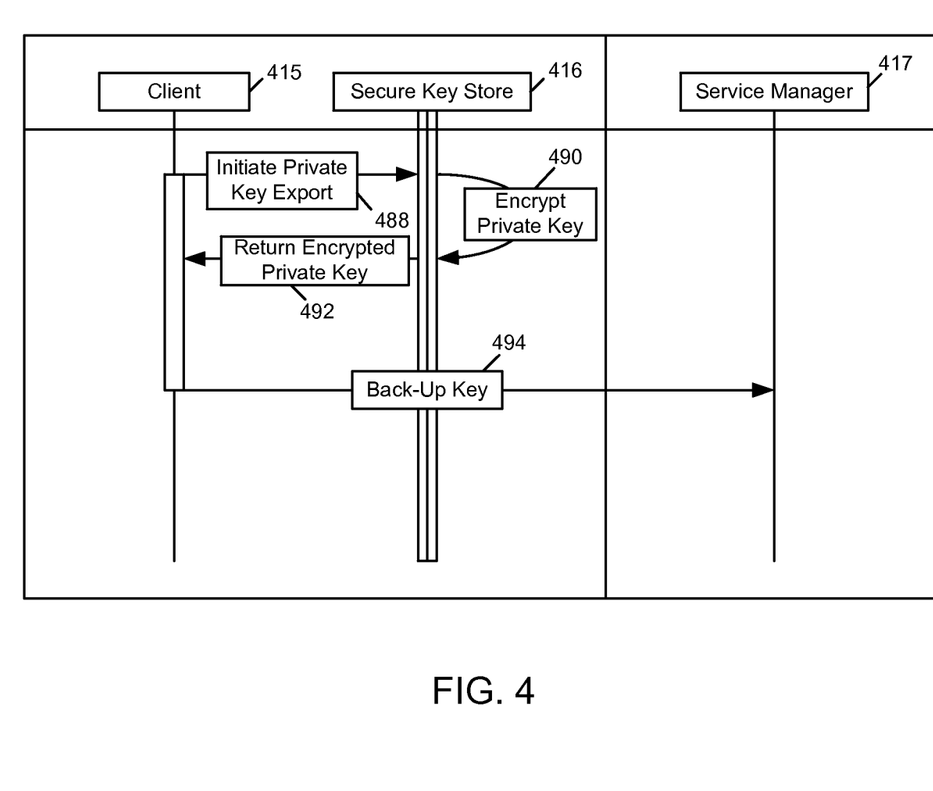
FIG. 4 includes a key redundancy system in an embodiment of the invention.

An embodiment concerns providing key backup for encryption certificates in a manner that does not operate via an OS, which may expose the backup keys and make them vulnerable to attack. FIG. 4 includes a certificate or key redundancy process in an embodiment of the invention. Client 415 initiates (block 488) exportation of a private key stored in out-of-band storage unit such as secure key store 416. Secure key store (e.g., located within a security coprocessor) encrypts the private key via, for example, using a public key of another node (block 490). The encrypted private key is then returned to client 415 (block 492) and then distributed as a backup key to service manager 417 (block 494), which may distribute the key to other user devices coupled to client 415.

Figure 5:
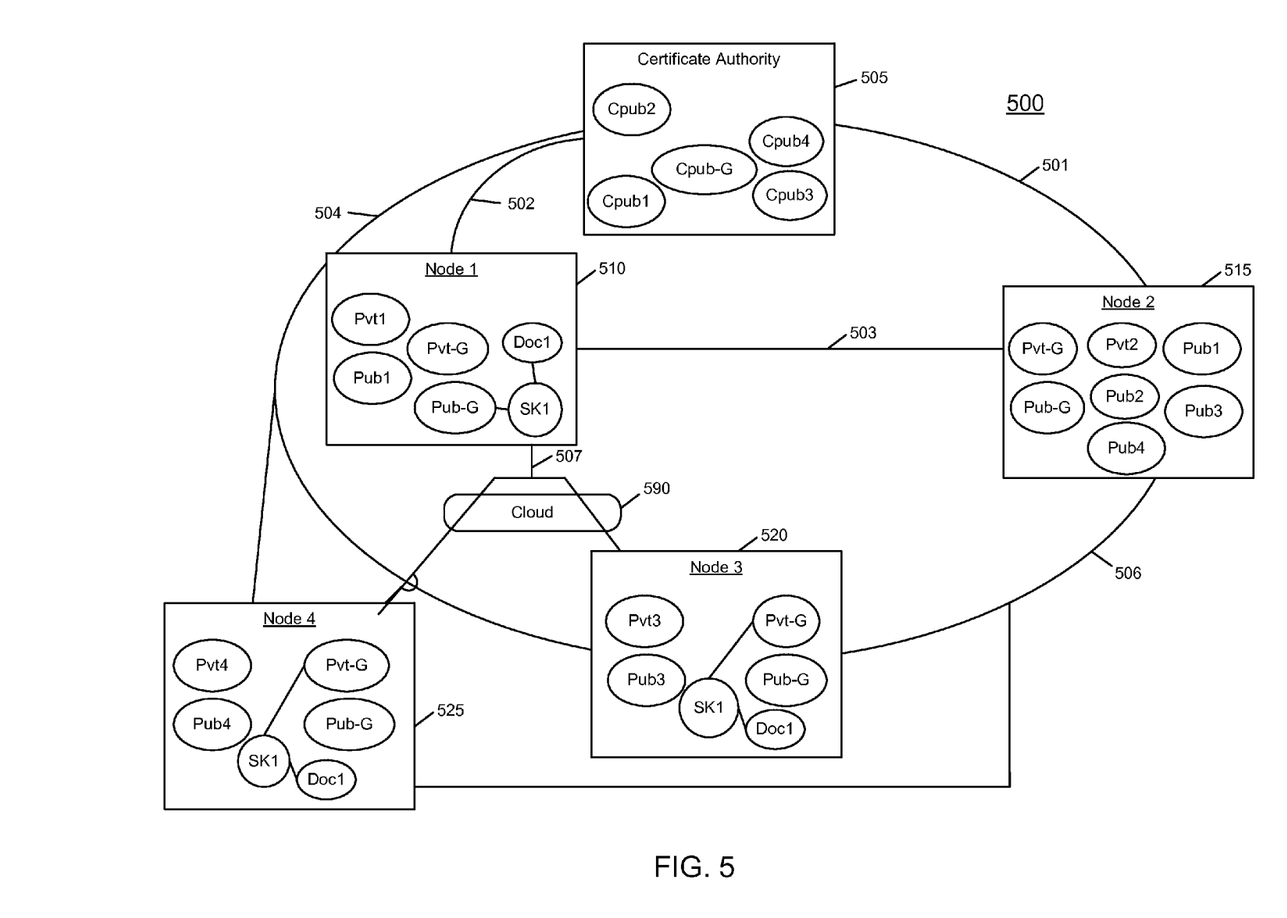
FIG. 5 includes a key provisioning and encryption process in an embodiment of the invention.
Figure 6:
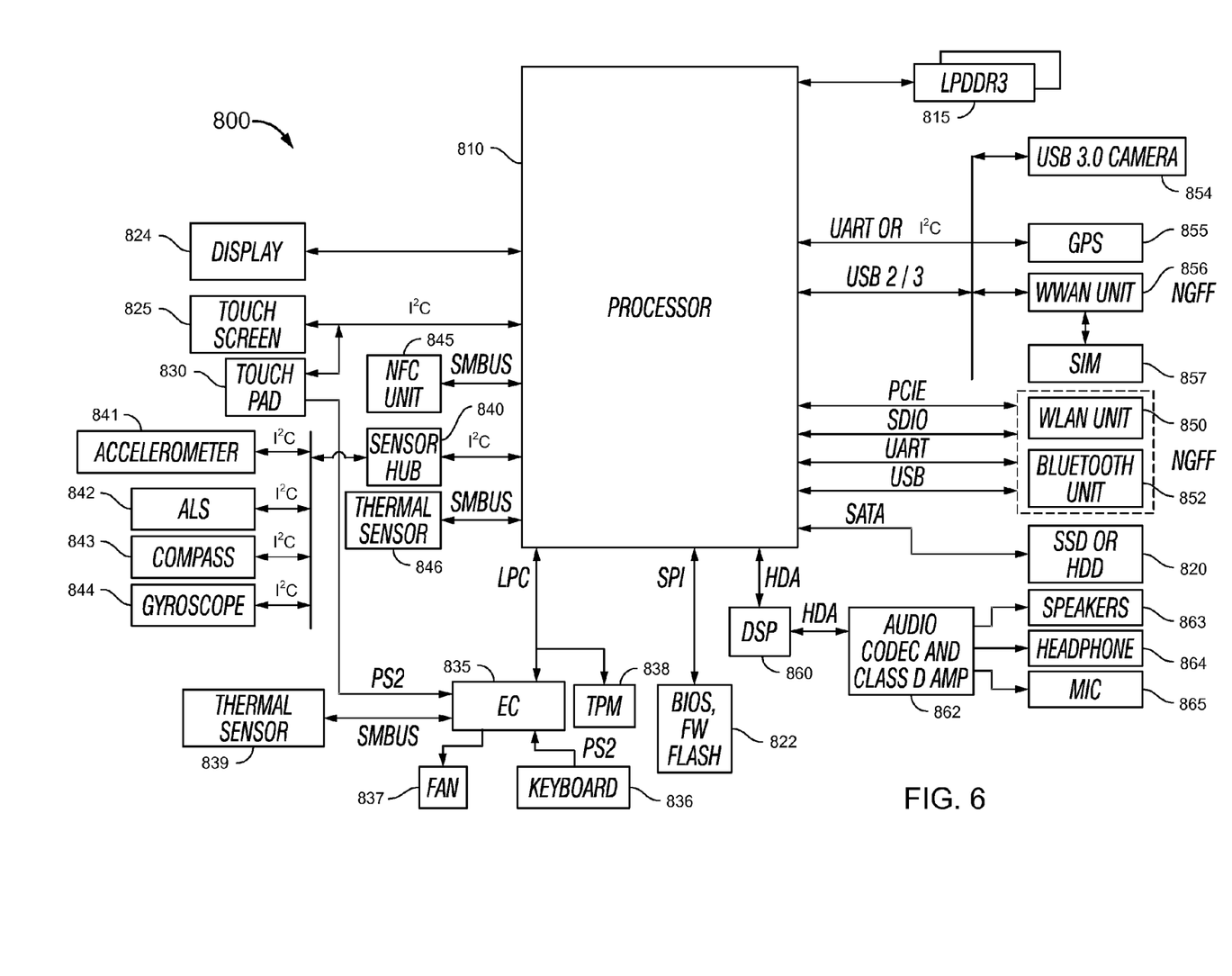
FIG. 6 is a block diagram of components present in a computer system in accordance with an embodiment of the invention.

FIG. 5 provides an illustrative example of how a private key may be securely distributed to several nodes. That private key and its public key may then be used to securely share information across nodes. In the example of FIG. 5 a node (Node2) may generate a special key pair for securing information for a node group. As will be explained below, in this example Node 2 generates a private key (Pvt-G) and a public key (Pub-G). The "G" indicates the key is distributed to a group.

FIG. 5 includes a system including certificate authority (CA) 505, computing node 1 (Node1) 510, computing node 2 (Node2) 515, computing node 3 (Node3) 520, and computing node 4 (Node4) 525. Each node respectively has asymmetric keys: Node1 has a private key (Pvt1) and corresponding public key (Pub1); Node2 has a private key (Pvt2) and a public key (Pub2) as well as a group private key (Pvt-G) and corresponding public key (Pub-G); Node3 has a private key (Pvt3) and corresponding public key (Pub3); and Node4 has a private key (Pvt4) and corresponding public key (Pub4). Each of private keys Pvt1, Pvt2, Pvt-G, Pvt3, Pvt4 may be respectively included in out-of-band security coprocessors or similar out-of-band mechanisms for the respective nodes. The private keys may be input into the out-of-band security coprocessors or other out-of-band mechanisms for each node by the node manufacturer, a related original equipment manufacturer (OEM), and the like. However, the private keys may also have been generated from within the out-of-band security coprocessors or other out-of-band mechanisms. As indicated above, for this particular example Node2 has self generated Pvt-G and Pub-G in addition to the Pvt2 and Pub2 key pair, but other embodiments are not so limited.

CA 505 has certificates corresponding to the Pub1 (Cpub1), Pub2 (Cpub2), Pub3 (Cpub3), and Pub4 (Cpub4). In arrow 501 Pub1, Pub3, and Pub4 are respectively distributed to Node2 via Cpub1, Cpub3, and Cpub4 (and any other nodes requiring the corresponding public keys).

With arrow 503 Node2 may encrypt Pvt-G with Pub1 and communicate encrypted Pvt-G to Node1. Afterwards, Node1 may decrypt encrypted Pvt-G with Pvt1. This decryption may occur within an out-of-band security coprocessor or other out-of-band mechanism for Node1. With arrow 506 Node2 may encrypt Pvt-G with Pub3 and communicate encrypted Pvt-G to Node3. With arrow 506 Node2 may encrypt Pvt-G with Pub4 and communicate encrypted Pvt-G to Node4. Afterwards, Node3 may decrypt encrypted Pvt-G with Pvt3. Node4 may decrypt encrypted Pvt-G with Pvt4. This decryption may occur within out-of-band security coprocessors or other out-of-band mechanisms. Thus, a private key (e.g., Pvt-G) may be distributed among a series of nodes without being "in the open" and is only decrypted within an out-of-band security coprocessors or other out-of-band mechanism.

CA 505 may also have a certificate corresponding to Pub-G (Cpub-G) and distribute the same via arrow 502 (Pub-G is distributed to Node1 via Cpub-G) and arrow 504 (Pub-G is distributed to Node3 and Node 4 via Cpub-G).

A session key (Sk1) is generated by Node1. Information, such as a document (Doc1), is encrypted with Sk1. Further, Sk1 is encrypted with Pub-G. Encrypted Sk1 is then bound to encrypted Doc1 and distributed to Node3 and Node4 (arrow 507). At Node3 and Node4 encrypted Sk1 is decrypted via Pvt-G within an out-of-band security coprocessor or other out-of-band mechanism. Afterwards, Doc1 is decrypted with the decrypted session keys. Thus, a document was distributed across different nodes (Node3, Node4) without being in the open. Doc1 may be stored (while encrypted) for a duration of time (e.g., temporarily or indefinitely) within cloud based storage system 590. Doc 1 may be automatically "pushed" to Node3 and/or Node4 to synchronize Doc1 across Node1, Node3, Node 4 and other nodes to which a user may want Doc1 distributed (e.g., Node2, NodeX).

As shown above, distribution of Pub-G allows anyone in the group to encrypt files by relevant session keys and encrypt those session keys with Pub-G (which are later decrypted with Pvt-G). Thus, Pub-G is a shared encryption key and Pvt-G is a shared decryption key so all nodes possessing both Pub-G and Pvt-G can participate in the above described encryption/decryption.

In an embodiment each node in the group has its own private/public pair so the nodes can send each other secret keys used in encryption. After each platform has its own key set any of the nodes can generate a group key pair (e.g., Pvt-G/Pub-G) and share both the private key (directly between the trusted stores within cryptoprocessors) and public key (which may or may not be visible to the OS) so that any of the group members can create session keys, encrypt them with the public key, and send them to the rest of the group. The rest of the group may use the shared private key to decrypt session key and with it encrypted content. While Node2 is shown in FIG. 5 as the node generating Pub-G and Pvt-G any of the nodes are capable of doing so.

Further, as a result of distributing Pvt-G the embodiment provides a distributed "back up" of the key used to encrypt Sk1 thereby providing resiliency in system 500. In addition, CA 505 may rescind Pub-G if the encryption integrity is lost and a new round of private key distribution may occur all while keeping the newly distributed private key from being "in the open" and instead safely ensconced within an out-of-band security co-processor or other out-of-band mechanism.

Further, FIG. 5 illustrates how information, such as Doc1, may be synchronized and distributed across various nodes coupled to cloud based storage. For example, once Node1 stores encrypted Doc1 at storage 590 Doc1 may then be "synched" to Node3 and Node 4.

Other paths for private key distribution among nodes may concern, for example, secure input technology or a completely automated public turing test to tell computers and humans apart (CAPTCHA), which is a program that can generate and grade visual tests (e.g., distorted text) that humans can pass but computer programs cannot. One form of secure input technology concerns use of a secure input pad where a user types in a password. For example, an embodiment may include an encrypted, secure I/O technology embedded into processors (i.e., hardware based), such as Intel® IPT with protected transaction display. Such an embodiment enables users to confirm user presence, verify transactions, and create secure personal identification number (PIN) input (i.e., secure input) prior to the release of credentials, thus eliminating risk from screen scrapers or keyloggers. In an embodiment an encrypted, randomized, bitmap keypad, enabled by hardware, is displayed to the user via an out-of-band cryptoprocessor. The user may then use the display to enter his or her PIN without OS based malware being able to see the location of the user's key entry (and the correlation to the location of the user's finger/screen contact to PIN values). ©Intel Corp., Santa Clara, Calif. The information entered by the user may serve as material for key entropy, which is performed within the cryptoprocessor. Other embodiments are not limited to such technology.

FIG. 6 is a block diagram of components present in a computer system in accordance with an embodiment of the present invention. Referring now to FIG. 6, shown is a block diagram of components present in a computer system in accordance with an embodiment of the present invention. Such a system may be used in any of the nodes described herein such as kiosk nodes, Smartphones, tablets, mobile computing nodes, servers, and the like (e.g., the nodes of FIG. 5). As shown in FIG. 6, system 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that the block diagram of FIG. 6 is intended to show a high level view of many components of the computer system. However, it is to be understood that additional components may be present in certain implementations and furthermore, different arrangement of the components shown may occur in other implementations.

As seen in FIG. 6, a processor 810, which may be a low power multicore processor socket such as an ultra low voltage processor, may act as a main processing unit and central hub for communication with the various components of the system. Such processor can be implemented as a system on a chip (SoC) as described herein. In one embodiment, processor 810 may be an Intel® Architecture Core™-based processor such as an i3, i5, i7 or another such processor available from Intel Corporation, Santa Clara, Calif., such as a processor that combines one or more Core™-based cores and one or more Intel® ATOM™-based cores to thus realize high power and low power cores in a single SoC. However, understand that other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments such as an Apple A5 or A6 processor.

Processor 810 may communicate with a system memory 815, which in an embodiment can be implemented via multiple memory devices to provide for a given amount of system memory. To provide for persistent storage of information such as data, applications, one or more operating systems and so forth, a mass storage 820 may also couple to processor 810. Also shown in FIG. 6, a flash device 822 may be coupled to processor 810 (e.g., via a serial peripheral interface (SPI)). This flash device may provide for non-volatile storage of system software, including a basic input/output software (BIOS) as well as other firmware of the system.

Various input/output (IO) devices may be present within system 800. Specifically shown in the embodiment of FIG. 6 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations (e.g., with regard to the display of information, accessing of information and so forth). In one embodiment, display 824 may be coupled to processor 810 via a display interconnect that can be implemented as a high performance graphics interconnect. Touch screen 825 may be coupled to processor 810 via another interconnect, which in an embodiment can be an I2C interconnect. As further shown in FIG. 6, in addition to touch screen 825, user input by way of touch can also occur via a touch pad 830 which may be configured within the chassis and may also be coupled to the same I2C interconnect as touch screen 825.

For perceptual computing and other purposes, various sensors may be present within the system and can be coupled to processor 810 in different manners. Certain inertial and environmental sensors may couple to processor 810 through a sensor hub 840, e.g., via an I2C interconnect. In the embodiment shown in FIG. 6, these sensors may include an accelerometer 841, an ambient light sensor (ALS) 842, a compass 843 and a gyroscope 844. Other environmental sensors may include one or more thermal sensors 846 which may couple to processor 810 via a system management bus (SMBus) bus, in one embodiment.

Also seen in FIG. 6, various peripheral devices may couple to processor 810 via a low pin count (LPC) interconnect. In the embodiment shown, various components can be coupled through an embedded controller 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as TPM 838 in accordance with the Trusted Computing Group (TCG) TPM Specification Version 1.2, dated Oct. 2, 2003, may also couple to processor 810 via this LPC interconnect. However, other security co-processors as addressed above are also or alternatively included in embodiments.

System 800 can communicate with external devices in a variety of manners, including wirelessly. In the embodiment shown in FIG. 6, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via a SMBus. Note that via this NFC unit 845, devices in close proximity to each other can communicate. For example, a user can enable system 800 to communicate with another portable device such as a Smartphone of the user via adapting the two devices together in close relation and enabling transfer of information such as identification information payment information, data such as image data or so forth. Wireless power transfer may also be performed using a NFC system.

As further seen in FIG. 6, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, for example, a USB link or a universal asynchronous receiver transmitter (UART) link. Or these units may couple to processor 810 via an interconnect via a Peripheral Component Interconnect Express™ (PCIe™) protocol in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the next generation form factor (NGFF) connectors adapted to a motherboard.

In addition, wireless wide area communications (e.g., according to a cellular or other wireless wide area protocol) can occur via a WWAN unit 856 which in turn may couple to a subscriber identity module (SIM) 857. In addition, to enable receipt and use of location information, a GPS module 855 may also be present. Note that in the embodiment shown in FIG. 6, WWAN unit 856 and an integrated capture device such as a camera module 854 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones to provide for high quality audio inputs to enable voice-activated control of various operations within the system. Note also that audio outputs can be provided from amplifier/CODEC 862 to a headphone jack 864. Although shown with these particular components in the embodiment of FIG. 6, understand the scope of the present invention is not limited in this regard.

In another example, a communication device may be arranged to perform any of the methods described herein. As a further example, at least one machine readable medium comprises a plurality of instructions that in response to being executed on a computing device, cause the computing device to carry out any of the methods described herein. An apparatus for processing instructions may be configured to perform the method of any of the methods described herein. And an apparatus may further include means for performing any of the methods described herein.

All optional features of the apparatus described above may also be implemented with respect to the method or process described herein. Specifics in the examples may be used anywhere in one or more embodiments.

Embodiments may be implemented in code and may be stored on a machine readable storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments.

Example 1 is a system comprising: a first computing node comprising a first secure cryptoprocessor having out-of-band non-volatile first memory that stores a hardware-based first private key that is non-visible to a first OS for the first computing node; a second computing node comprising a second secure cryptoprocessor having out-of-band non-volatile second memory that stores a hardware-based second private key that is non-visible to a second OS for the second computing node and that corresponds to a second public key; at least one storage medium having instructions stored thereon to cause: the first computing node to: receive the second public key; determine a first session key and encrypt first information with the first session key; encrypt the first session key with the second public key; bind the encrypted first session key to the encrypted first information; and communicate the bound encrypted first session key and encrypted first information to cloud based storage; and the second computing node to: receive the bound encrypted first session key and encrypted first information from the cloud based storage; decrypt the encrypted first session key with the second private key while the second private key is still located within the second cryptoprocessor; and decrypt the encrypted first information with the decrypted first session key. Such a cryptoprocessor may include a tamper-resistant security system and a secure file system that provides security services. "Out of band" indicates the activity or function is not visible to a processor to which the band refers.

In Example 2, the subject matter of Example 1 can optionally include the second public key bound to a certificate when communicated to the first computing node.

In Example 3, the subject matter of Examples 1-2 can optionally include the first and second private keys based at least in part on a family key pair for the first and second computing nodes, wherein the second public key is a family public key operative with the first and second private keys.

Family key pairs are discussed in U.S. Pat. No. 7,693,286, assigned to Intel Corporation. Such key pairs may be used in a Direct Proof (DP) protocol in which an issuer defines a family of many members that share common characteristics as defined by the issuer. The issuer generates a Family public and private key pair (Fpub and Fpri) that represents the family as a whole. Using Fpri, the issuer can also generate a unique Direct Proof private signing key (DPpri) for each individual member in the family. Any message signed by an individual DPpri can be verified using the family public key Fpub. However, such verification only identifies that the signer is a member of the family; no uniquely identifying information about the individual member is exposed. In one embodiment, the issuer may be a device manufacturer or delegate. That is, the issuer may be an entity with the ability to define device Families based on shared characteristics, generate the Family public/private key pair, and to create and inject DP private keys into devices. The issuer may also generate certificates for the Family public key that identify the source of the key and the characteristics of the device family. (As described above with regard to FIG. 5, this family key pair may include the Pub-G and Pvt-G keys of FIG. 5 in some embodiments but in other embodiments Pub-G and Pvt-G are not part of the above described DP protocol.)

In Example 4, the subject matter of Examples 1-3 can optionally include the first and second private keys being equivalent to one another.

In Example 5, the subject matter of Examples 1-4 can optionally include a third computing node comprising a third secure cryptoprocessor having out-of-band non-volatile third memory that stores a hardware-based third private key that is non-visible to a third OS for the third computing node and that corresponds to a third public key; the at least one medium comprising instructions to cause the third computing node to: receive an encrypted second private key; receive the bound encrypted first session key and encrypted first information from the cloud based storage; decrypt the encrypted second private key with the third private key while the third private key is still located in the third cryptoprocessor; decrypt the encrypted first session key with the decrypted second private key; and decrypt the encrypted first information with the decrypted first session key.

At times herein a key is said to be distributed and the like. This may entail distributing a replication, copy, or instance of the key. Thus, distributing a private key from Node3 to Node1 does not necessarily mean Node3 no longer has the key (or in an instance of the key). As shown in FIG. 5 Nodes 1-4 all include instances of Pvt2 simultaneously or in parallel with one another.

In Example 6, the subject matter of Examples 1-5 can optionally include at least one medium comprising instructions to cause at least one of the first computing node, second computing node, and another computing node to encrypt the second private key with the third public key; and communicate the encrypted second private key to the third computing node.

In Example 7, the subject matter of Examples 1-6 can optionally include at least one medium comprising instructions to cause at least one of the second computing node and another computing node to encrypt the second private key with a first public key, and communicate the encrypted second private key to the first computing node.

In another version of Example 7 the subject matter of Examples 1-6 can optionally include at least one medium comprising instructions to cause at least one of the second computing node and another computing node to encrypt the second private key with a first public key, communicate the encrypted second private key to the first computing node; and decrypt the encrypted second private key with the first private key while the first private key is still located in the first cryptoprocessor.

In Example 8, the subject matter of Examples 1-7 can optionally include the at least one medium comprising instructions to cause: at least one of the first computing node and another computing node to encrypt the second private key with an additional public key and communicate the encrypted second private key to the second computing node; and the second computing node to, within the second cryptoprocessor, decrypt the second private key and store the decrypted second private key within the second memory; wherein the second computing node includes an additional private key corresponding to the additional public key.

While Examples 5-8 concern provisioning private keys to computing nodes in the context of Examples 1-4, such provisioning may be independent of Examples 1-4. An example includes a system comprising: a first computing node comprising a first secure cryptoprocessor having out-of-band non-volatile first memory that stores a hardware-based first private key that is non-visible to a first operating system (OS) for the first computing node; a second computing node comprising a second secure cryptoprocessor having out-of-band non-volatile second memory that stores a hardware-based second private key that is non-visible to a second OS for the second computing node and that corresponds to a second public key; at least one storage medium having instructions stored thereon to cause at least one of the second computing node and another computing node to encrypt the second private key with a first public key, and communicate the encrypted second private key to the first computing node.

In Example 9, the subject matter of Examples 1-8 can optionally include the first private key corresponding to a first public key and the at least one medium is distributed among at least one of the first and second computing nodes.

Thus, the system may include instructions stored in memories of two distributed nodes, such as a Smartphone coupled to a tablet. Some of the instructions may be stored in memory included in or controlled by the cloud storage unit. Thus, the instructions and storage mediums may be distributed across various nodes and may operate simultaneously, in cooperation with one another and non-simultaneous times, and/or independently of one another.

In Example 10, the subject matter of Examples 1-9 can optionally include the at least one medium comprising instructions to cause the first computing node to encrypt, out-of-band, the first information with the first session key.

In Example 11, the subject matter of Examples 1-10 can optionally include the second public key communicated to the first computing node from at least one of the second computing node and a certificate authority.

In Example 12, the subject matter of Examples 1-11 can optionally include the at least one medium comprising instructions to cause the first computing node to bind a certificate, which corresponds to the second public key, to the encrypted first session key and encrypted first information. The certificate may serve for authentication purposes to inform the recipient node that the delivering node is providing an authentic public key with which to decrypt information encrypted via a private key. While PKI systems are discussed at length herein other embodiments may rely more upon other systems, such as symmetric key systems, or different versions of PKI systems such as family key systems, to help users maintain control of keys and encryption of documents in an out-of-band manner and independently of a cloud storage provider.

Example 13 includes at least one storage medium having instructions stored thereon to cause a system to: receive an encrypted first session key bound to an encrypted first information from a first computing node via cloud based storage; wherein the first information is encrypted with a first session key and the first session key is encrypted with a second public key; decrypt the bound encrypted first session key with a second private key, and decrypt the encrypted first information with the decrypted first session key; wherein the first computing node comprises the second public key and a secure out-of-band non-volatile first memory that stores a hardware-based first private key that is non-visible to a first operating system (OS) for the first computing node; wherein the system includes a second computing node comprising a secure out-of-band non-volatile second memory that stores the second private key non-visibly to a second OS for the second computing node, the second private key corresponding to the second public key.

Thus, an embodiment is not necessarily limited to a system of nodes but may instead focus more on one node, such as Node 3 in FIG. 5, and that node's interaction with other nodes.

Another version of Example 13 includes at least one storage medium having instructions stored thereon to cause a system to: receive an encrypted first session key bound to an encrypted first information from a first computing node via cloud based storage; wherein the first information is encrypted with the first session key and the first session key is encrypted with a second public key; decrypt the bound encrypted first session key with a second private key, and decrypt the encrypted first information with the decrypted first session key; wherein the first computing node comprises the second public key and a secure out-of-band non-volatile first memory; wherein the system includes a second computing node comprising a secure out-of-band non-volatile second memory that stores the second private key non-visibly to a second operating system (OS) for the second computing node, the second private key corresponding to the second public key.

In Example 14, the subject matter of Example 13 can optionally include instructions to: encrypt the second private key with a first public key while the second private key is included in the second memory; and communicate the encrypted second private key to the first computing node.

In Example 15, the subject matter of Examples 13-14 can optionally include instructions to: encrypt the second private key with a third public key while the second private key is included in the second memory; and communicate the encrypted second private key to a third computing node.

In Example 16, the subject matter of Examples 13-15 can optionally include in instructions to receive an encrypted second private key from at least one of another computing node and the first computing node; and decrypt the encrypted second private key with an additional private key stored in the second memory and store the decrypted second private key within the second memory.

All features of Examples 13-16 may also be implemented with respect to a method or process described herein.

Example 17 includes a method executed by at least one processor comprising: a first computing node, comprising a secure out-of-band non-volatile first memory that stores a hardware-based first private key that is non-visible to a first operating system (OS) for the first computing node, (a)(1) receiving a second public key; (a)(2) determining a first session key and encrypting first information with the first session key; (a)(3) encrypting the first session key with the second public key; (a)(4) binding the encrypted first session key to the encrypted first information; and (a)(5) communicating the bound encrypted first session key and encrypted first information to cloud based storage; and a second computing node, comprising a secure out-of-band non-volatile second memory that stores a hardware-based second private key that is non-visible to a second OS for the second computing node and that corresponds to the second public key, (b)(1) decrypting the bound encrypted first session key with the second private key while the second private key is stored in the second memory, and (b)(2) decrypting the encrypted first information with the decrypted first session key.

Another version of Example 17 includes a first computing node, comprising a secure out-of-band non-volatile first memory that stores a hardware-based first private key that is non-visible to a first operating system (OS) for the first computing node, (a)(1) receiving a second public key; (a)(2) determining a first session key and encrypting first information with the first session key; (a)(3) encrypting the first session key with the second public key; (a)(4) binding the encrypted first session key to the encrypted first information; and (a)(5) communicating the bound encrypted first session key and encrypted first information to cloud based storage; and a second computing node, comprising a secure out-of-band non-volatile second memory that stores a hardware-based second private key that is non-visible to a second OS for the second computing node and that corresponds to the second public key, (b)(1) receiving and decrypting the bound encrypted first session key with the second private key while the second private key is stored in the second memory, and (b)(2) decrypting the encrypted first information with the decrypted first session key.

In Example 18, the subject matter of Example 17 can optionally include a third computing node, comprising a secure out-of-band non-volatile third memory that stores a hardware based third private key that is non-visible to a third OS for the third computing node and that corresponds to a third public key, (c)(1) receiving an encrypted second private key; (c)(2) receiving the bound encrypted first session key and encrypted first information; (c)(3) decrypting the encrypted second private key with the third private key while the third private key is stored in the third memory; (c)(4) decrypting the bound encrypted first session key with the decrypted second private key while the second private key is included in the third memory; and (c)(5) decrypting the encrypted first information with the decrypted first session key.

In Example 19, the subject matter of Examples 17-18 can optionally include encrypting the second private key with a first public key that corresponds to the first private key; and communicating the encrypted second private key to the first computing node.

In Example 20, the subject matter of Examples 17-19 can optionally include encrypting the second private key with an additional public key; communicating the encrypted second private key to the second computing node from at least one of another computing node and the first computing node; and decrypting the second private key with an additional private key while the additional private key is stored in the second memory and storing the decrypted second private key within the second memory.

An example includes at least one machine readable medium comprising a plurality of instructions that in response to being executed on a computing device, cause the computing device to carry out a method according to any one of claims 17 to 20.

An example includes means for performing any one of Examples 13 to 20.

An example includes a communications device arranged to carry out a method according to any one of claims 13 to 20.

Example 21 includes a method executed by at least one processor comprising: receiving an encrypted first session key bound to an encrypted first information from a first computing node via cloud based storage; wherein the first information is encrypted with the first session key and the first session key is encrypted with a second public key; decrypting the bound encrypted first session key with a second private key, and decrypt the encrypted first information with the decrypted first session key; wherein the first computing node comprises the second public key and a secure out-of-band non-volatile first memory; wherein the system includes a second computing node comprising a secure out-of-band non-volatile second memory that stores the second private key non-visibly to a second operating system (OS) for the second computing node, the second private key corresponding to the second public key.

In Example 22, the subject matter of Example 21 can optionally include encrypting the second private key with a first public key while the second private key is included in the second memory; and communicating the encrypted second private key to the first computing node.

In another version of Example 22, the subject matter of Example 21 can optionally include encrypting the second private key with a first public key while the first public key is included in the second memory; and communicating the encrypted second private key to the first computing node.

In Example 23, the subject matter of Examples 21-22 can optionally include encrypting the second private key with a third public key while the second private key is included in the second memory; and communicating the encrypted second private key to a third computing node.

In another version of Example 23, the subject matter of Examples 21-22 can optionally include encrypting the second private key with a third public key while the third public key is included in the second memory; and communicating the encrypted second private key to a third computing node.

In Example 24, the subject matter of Examples 21-23 can optionally include receiving an encrypted second private key from at least one of another computing node and the first computing node; and decrypting the encrypted second private key with an additional private key stored in the second memory and storing the decrypted second private key within the second memory.

In Example 25, the subject matter of Examples 21-24 can optionally include at least one machine readable medium comprising a plurality of instructions that in response to being executed on a computing device, cause the computing device to carry out a method according to any one of Examples 21-24.

In Example 26, the subject matter of Examples 21-24 can optionally include an apparatus comprising means for performing any one of Examples 21-24.

In Example 27, the subject matter of Examples 21-24 can optionally include a communications device arranged to carry out a method according to any one of Examples 21 to 24.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system of computing nodes comprising:
a first computing node comprising a first secure cryptoprocessor having out-of-band non-volatile first memory that stores a hardware-based first private key that is non-visible to a first operating system (OS) for the first computing node;
a second computing node comprising a second secure cryptoprocessor having out-of-band non-volatile second memory that stores a hardware-based second private key that is non-visible to a second OS for the second computing node and that corresponds to a second public key; and
at least one non-transitory storage medium having instructions stored thereon to cause:
the first computing node to: receive the second public key; determine a first session key and encrypt first information with the first session key; encrypt the first session key with the second public key; bind the encrypted first session key to the encrypted first information; and communicate the bound encrypted first session key and encrypted first information to cloud based storage; and
the second computing node to receive and decrypt the bound encrypted first session key with the second private key, while the second private key is still located within the second cryptoprocessor, and the encrypted first information with the decrypted first session key;
wherein the at least one medium further comprises instructions to cause:
the first secure cryptoprocessor to encrypt the first private key and communicate the encrypted first private key to the first computing node;
the first computing node to communicate the encrypted first private key to a third computing node; and
the second computing node to receive the encrypted first private key from the third computing node.

2. The system of claim 1, wherein the second public key is bound to a certificate when communicated to the first computing node.

3. The system of claim 1, wherein the first and second private keys are based at least in part on a family key pair for the first and second computing nodes, wherein the second public key is a family public key operative with the first and second private keys.

4. The system of claim 1, wherein the first and second private keys are equivalent to one another.

5. The system of claim 1 comprising:
the third computing node comprising a third secure cryptoprocessor having out-of-band non-volatile third memory that stores a hardware-based third private key that is non-visible to a third OS for the third computing node and that corresponds to a third public key;
the at least one medium comprising instructions to cause the third computing node to:
receive an encrypted second private key; receive the bound encrypted first session key and encrypted first information from the cloud based storage;
decrypt the encrypted second private key with the third private key while the third private key is still located in the third cryptoprocessor;
decrypt the encrypted first session key with the decrypted second private key; and
decrypt the encrypted first information with the decrypted first session key.

6. The system of claim 5, the at least one medium comprising instructions to cause at least one of the first computing node, second computing node, and another computing node to encrypt the second private key with the third public key; and communicate the encrypted second private key to the third computing node.

7. The system of claim 1, the at least one medium comprising instructions to cause at least one of the second computing node and another computing node to encrypt the second private key with a first public key, and communicate the encrypted second private key to the first computing node.

8. The system of claim 1, the at least one medium comprising instructions to cause:
at least one of the first computing node and another computing node to encrypt the second private key with an additional public key and communicate the encrypted second private key to the second computing node; and
the second computing node to, within the second cryptoprocessor, decrypt the second private key and store the decrypted second private key within the second memory; wherein the second computing node includes an additional private key corresponding to the additional public key.

9. The system of claim 1, wherein the first private key corresponds to a first public key and the at least one medium is distributed among at least one of the first and second computing nodes.

10. The system of claim 1, the at least one medium comprising instructions to cause the first computing node to encrypt, out-of-band, the first information with the first session key.

11. The system of claim 1, wherein the second public key is communicated to the first computing node from at least one of the second computing node and a certificate authority.

12. The system of claim 1, the at least one medium comprising instructions to cause the first computing node to bind a certificate, which corresponds to the second public key, to the encrypted first session key and encrypted first information.

13. At least one non-transitory storage medium having instructions stored thereon to cause a system to:
receive an encrypted first session key bound to an encrypted first information from a first computing node via cloud based storage; wherein the first information is encrypted with the first session key and the first session key is encrypted with a second public key;
decrypt the bound encrypted first session key with a second private key, and decrypt the encrypted first information with the decrypted first session key;
receive an encrypted instance of the second private key, from a secure cryptoprocessor, and communicate the encrypted second private key to a third computing node and the first computing node so the first computing node can receive the encrypted second private key from a second computing node included in the system; and
receive an encrypted first private key from the third computing node;
wherein the first computing node comprises the second public key and a secure out-of-band non-volatile first memory;
wherein the second computing node comprises the secure cryptoprocessor having a secure out-of-band non-volatile second memory that stores the second private key non-visibly to a second operating system (OS) for the second computing node, the second private key corresponding to the second public key.

14. The at least one medium of claim 13 comprising instructions to:
encrypt the second private key with a first public key, to produce an additional encrypted second private key, while the second private key is included in the second memory.

15. The at least one medium of claim 13 comprising instructions to:
encrypt the second private key with a third public key, to produce an additional encrypted second private key, while the second private key is included in the second memory; and
communicate the additional encrypted second private key to the third computing node.

16. The at least one medium of claim 13 comprising instructions to:
receive an encrypted second private key from at least one of another computing node and the first computing node; and
decrypt the encrypted second private key with an additional private key stored in the second memory and store the decrypted second private key within the second memory.

17. A method executed by at least one processor comprising:
a first computing node, comprising a secure out-of-band non-volatile first memory that stores a hardware-based first private key that is non-visible to a first operating system (OS) for the first computing node, (a)(1) receiving a second public key; (a)(2) determining a first session key and encrypting first information with the first session key; (a)(3) encrypting the first session key with the second public key; (a)(4) binding the encrypted first session key to the encrypted first information; and (a)(5) communicating the bound encrypted first session key and encrypted first information to cloud based storage; and
a second computing node, comprising a secure out-of-band non-volatile second memory that stores a hardware-based second private key that is non-visible to a second OS for the second computing node and that corresponds to the second public key, (b)(1) receiving and decrypting the bound encrypted first session key with the second private key while the second private key is stored in the second memory, and (b)(2) decrypting the encrypted first information with the decrypted first session key;
wherein the method further comprises:
a first secure cryptoprocessor encrypting the first private key and communicating the encrypted first private key to the first computing node and a third computing node; and
the second computing node receiving the encrypted first private key from the third computing node.

18. The method of claim 17 comprising:
the third computing node, comprising a secure out-of-band non-volatile third memory that stores a hardware based third private key that is non-visible to a third OS for the third computing node and that corresponds to a third public key, (c)(1) receiving an encrypted second private key; (c)(2) receiving the bound encrypted first session key and encrypted first information; (c)(3) decrypting the encrypted second private key with the third private key while the third private key is stored in the third memory; (c)(4) decrypting the bound encrypted first session key with the decrypted second private key while the second private key is included in the third memory; and (c)(5) decrypting the encrypted first information with the decrypted first session key.

19. The method of claim 17 comprising:
encrypting the second private key with a first public key that corresponds to the first private key; and
communicating the encrypted second private key to the first computing node.

20. The method of claim 17 comprising:
encrypting the second private key with an additional public key;
communicating the encrypted second private key to the second computing node from at least one of another computing node and the first computing node; and
decrypting the second private key with an additional private key while the additional private key is stored in the second memory and storing the decrypted second private key within the second memory.

* * * * *